United States Patent [19]

Allen

[11] 4,005,290
[45] Jan. 25, 1977

[54] NEUTRON-NEUTRON LOGGING

[75] Inventor: Linus S. Allen, Dallas, Tex.

[73] Assignee: Mobil Oil Corporation, New York, N.Y.

[22] Filed: June 25, 1975

[21] Appl. No.: 590,362

[52] U.S. Cl. .............................. 250/266; 250/261; 250/269

[51] Int. Cl.² ......................................... G01V 5/00

[58] Field of Search .......... 250/269, 270, 266, 264, 250/262, 261

[56] References Cited

UNITED STATES PATENTS

| | | | |
|---|---|---|---|
| 2,776,378 | 1/1957 | Youmans | 250/264 |
| 3,491,238 | 1/1970 | Allen | 250/269 |
| 3,532,884 | 10/1970 | Dewan | 250/266 |
| 3,567,936 | 3/1971 | Tittman | 250/269 |

Primary Examiner—Harold A. Dixon
Attorney, Agent, or Firm—C. A. Huggett; George W. Hager, Jr.

[57] ABSTRACT

A borehole logging tool includes a steady-state source of fast neutrons, two epithermal neutron detectors, and two thermal neutron detectors. A count rate meter is connected to each neutron detector. A first ratio detector provides an indication of the porosity of the formation surrounding the borehole by determining the ratio of the outputs of the two count rate meters connected to the two epithermal neutron detectors. A second ratio detector provides an indication of both porosity and macroscopic absorption cross section of the formation surrounding the borehole by determining the ratio of the outputs of the two count rate meters connected to the two thermal neutron detectors. By comparing the signals of the two ratio detectors, oil bearing zones and salt water bearing zones within the formation being logged can be distinguished and the amount of oil saturation can be determined.

6 Claims, 2 Drawing Figures

NEUTRON-NEUTRON LOGGING

BACKGROUND OF THE INVENTION

This invention relates to radioactive well logging and more particularly to an improved method of and system for distinguishing between oil bearing zones and salt water bearing zones in subsurface formations surrounding a borehole and for further use in determining the oil saturation of an identified oil bearing zone.

In neutron-neutron logging, a steady-state source of primary radiation irradiates the formations surrounding the borehole with neutrons. The resulting secondary radiation can be measured by detectors axially spaced from such source within the borehole. The resulting secondary radiation includes epithermal neutrons, thermal neutrons, and thermal neutron capture gamma rays. For a point source in an infinite, homogeneous medium, this secondary radiation can be represented as follows:

$$\Phi_t(r) = \frac{Q L_t^2}{4\pi D_t (L_e^2 - L_t^2)} \left( \frac{e^{-r/L_e}}{r} - \frac{e^{-r/L_t}}{r} \right) \quad (1)$$

where,
$\Phi_t$ is the thermal neutron flux,
$r$ is the radial distance measured from the source,
$Q$ is the point neutron source strength,
$D$ is the thermal neutron diffusion coefficient,
$L_e$ is the epithermal neutron parameter (slowing down length), and
$L_t$ is the thermal neutron parameter (diffusion length).

The epithermal neutron parameter $L_e$ of the formation principally is determined by the concentration of hydrogen in the formation, and hydrogen content is related to the porosity of the formation. However, the presence of oil or salt water in the pore spaces of the formation has little or not effect on the porosity. Consequently, the presence of oil or salt water in the formation has little or no effect on the number of epithermal neutrons returning to the borehole as secondary radiation.

The thermal neutron parameter $L_t$ of the formation, on the other hand, is affected by the presence of oil or salt water and is significantly reduced when the pore spaces of the formation contain salt water rather than oil. The chlorine present in the salt water has a large capture cross section for thermal neutrons and, consequently, reduces the number of thermal neutrons returning to the borehole as secondary radiation. At the same time, the capture of thermal neutrons by the chlorine effects an increase in the number of thermal neutron capture gamma rays returning to the borehole as secondary radiation.

SUMMARY OF THE INVENTION

In accordance with the present invention, a steady-state source of primary radiation is located within a borehole for irradiating the formations surrounding the borehole with fast neutrons. A first pair of detectors located at spaced-apart positions from the source within the borehole measure that secondary radiation affected predominantly by the epithermal neutron parameters of the formation. A second pair of detectors located at spaced-apart positions from the source within the borehole measure that secondary radiation affected by both the epithermal and the thermal neutron parameters of the formation. A ratio is taken of the measurements from the first pair of detectors as an indication of the formation porosity. A ratio is taken of the measurements from the second pair of detectors as an indication of both porosity and macroscopic absorption cross section of the formation. An increase in the differential between these two ratios at any given depth indicates a change from an oil bearing zone to a salt water bearing zone in the formation at that depth, while a decrease in this differential indicates a change from a salt water bearing zone to a oil bearing zone.

More particularly, the first pair of detectors measure the intensity of epithermal neutrons returning to the borehole from the formation. The second pair of detectors may measure the intensity of either thermal neutrons or thermal neutron capture gamma rays returning to the borehole from the formation.

In a further aspect, the differential between the two determined ratios is corrected by known factors for the macroscopic absorption cross sections of rock, oil, and water in the formation to give an indication of the amount of oil saturation in an identified oil bearing zone.

DESCRIPTION OF THE PREFERRED EMBODIMENT

The present invention is directed toward a method and system of neutron-neutron logging for distinguishing oil bearing zones from salt water bearing zones in a subsurface formation.

Figure 1:
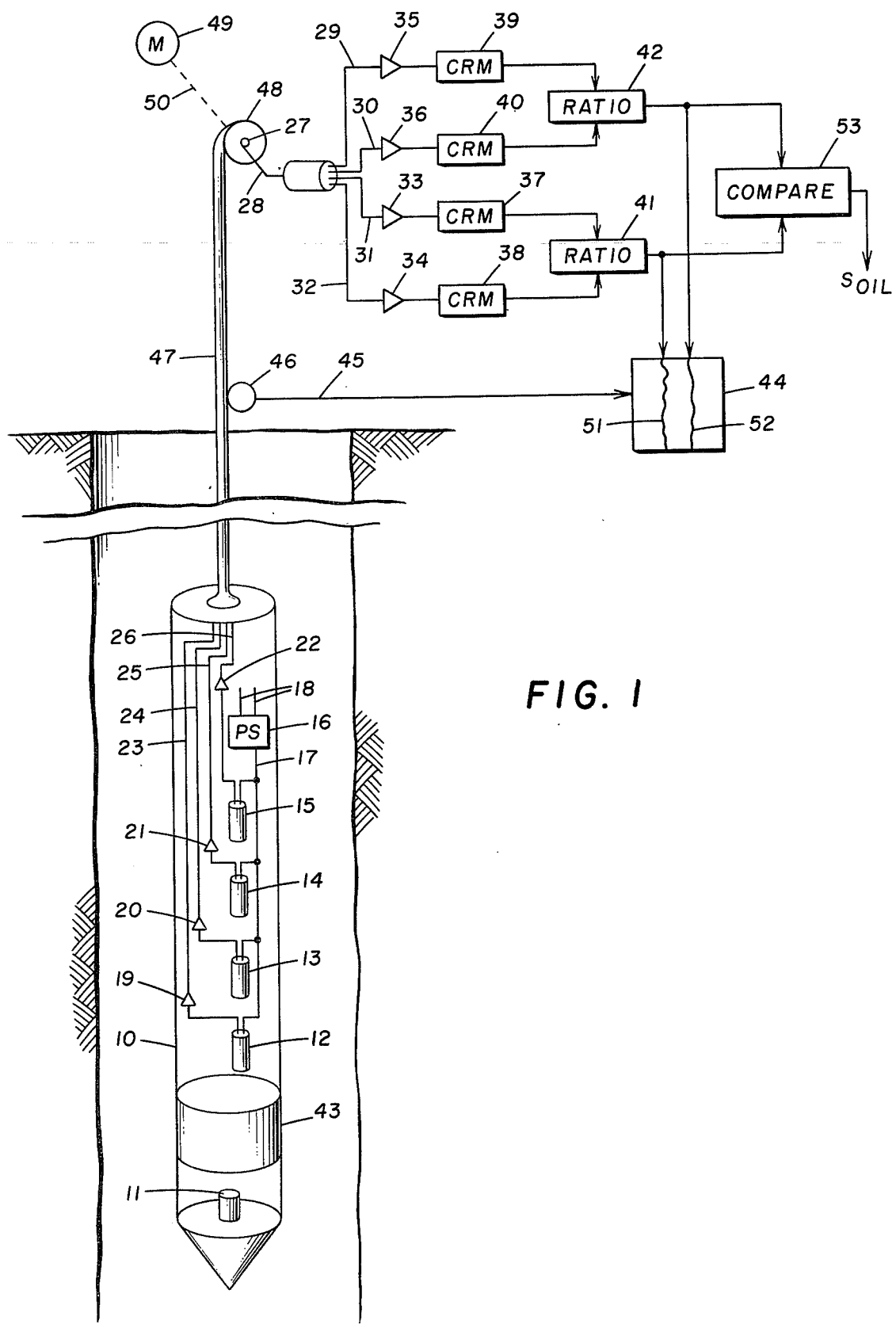
FIG. 1 illustrates a borehole system for carrying out the present invention.

Referring to FIG. 1, a borehole logging tool 10 has a steady-state neutron source 11 for irradiating the formations, two spaced-apart thermal neutron detectors 12 and 13, and two spacedapart epithermal neutron detectors 14 and 15. The neutron source 11 preferably is a steady-state Am-Be fast neutron source with an average energy of about 4 million electron volts. The thermal neutron detectors 12 and 13 may be proportional counters of the type disclosed in U.S. Pat. No. 3,102,198 to Bonner and filled with six atmospheres of helium-3 gas. Detectors of this type are very sensitive to thermal neutrons. A shield 43 protects the thermal neutron detectors 12 and 13 from directed neutron radiation from the neutron source 11. The epithermal neutron detectors 14 and 15 may be of the same type proportional counters as detectors 12 and 13 with cadmium shielding to prevent thermal neutrons from reaching the active volume of the detectors. A power supply 16 is located within the borehole tool 10 for supplying power to the thermal neutron detectors 12–15 by the way of conductor 17. Current is applied to the power supply 16 from the surface by way of conductors 18. The outputs of the thermal neutron detectors 12–15 are applied to amplifiers 19–22 which in turn are coupled to conductors 23–26 included in the cable 47. At the surface, the outputs from conductors 23–26 are applied by way of the slip rings 27 and brushes 28 to conductors 29–32 which extend to amplifiers 33–36. The outputs of amplifiers 33 and 34 are applied to the thermal neutron count rate meters 37 and 38, while the outputs of amplifiers 35 and 36 are applied to the epithermal neutron count rate meters 39 and 40.

The outputs of the thermal neutron count rate meters 37 and 38 are applied to the ratio detector 41, while the outputs of the epithermal neutron count rate meters 39 and 40 are applied to the ratio detector 42. Ratio detectors 41 and 42 may be of a conventional type as disclosed on pages 338 and 339 in ELECTRONIC ANALOG COMPUTERS, Gravino A. Korn and Theresa M. Korn, McGraw-Hill Book Company, Inc., New York, 1956.

Figure 2:
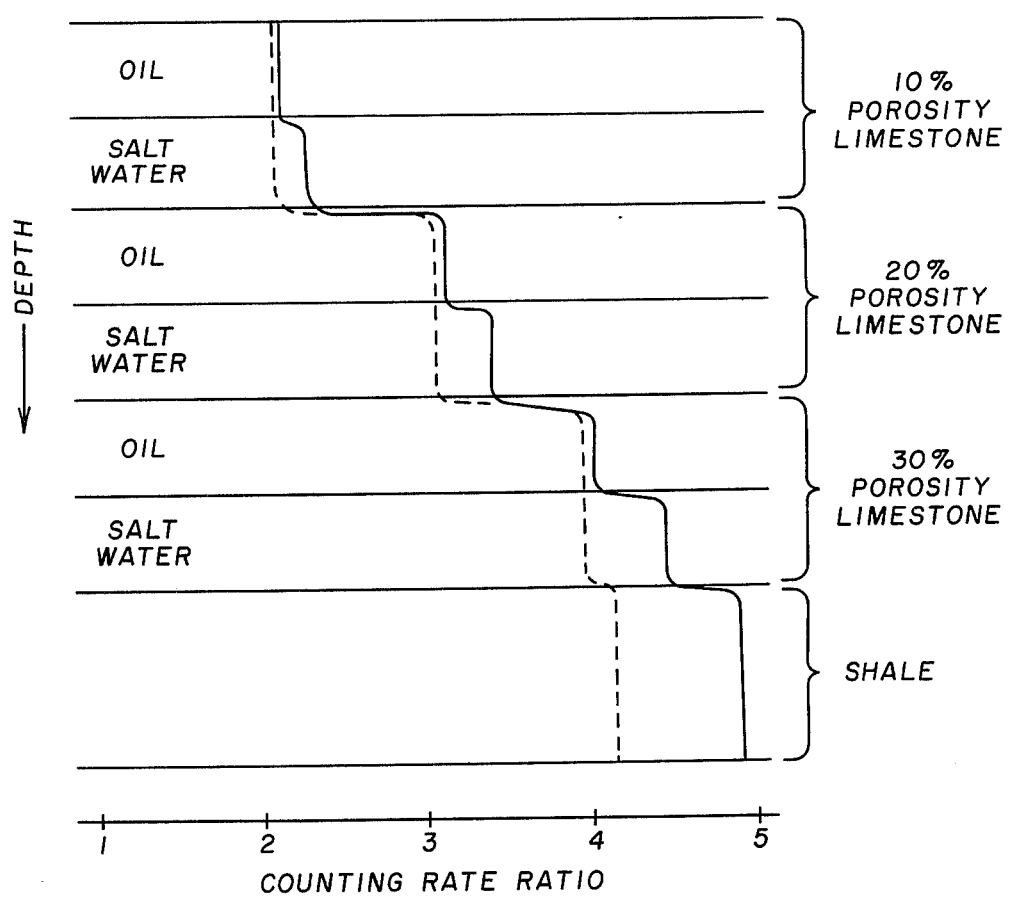
FIG. 2 illustrates in graphical form characteristics of example subsurface formations as might be encountered when logging with the borehole system of FIG. 1.

By taking the ratio of the counting rates from the two epithermal neutron detectors, a signal is obtained that responds predominantly to changes in the porosity $\phi$ of the given formation. Further, by taking the ratio of the counting rates from the two thermal neutron detectors, a signal is obtained that responds predominantly to changes in both the porosity $\phi$ and the macroscopic absorption cros section $\Sigma$ of the given formation. It has been found that the salinity of the fluid in the formation affects the macroscopic absorption cross section of the formation but has no effect on the porosity of the formation. Consequently, by comparing the signals of the two ratio detectors 41 and 42, an indication is obtained each time there is a change in the salinity of the fluid in the formation. More particularly, when the pores of the formation contain salt water rather than oil, the signal from ratio detector 41 increases while the signal from ratio detector 42 remains unchanged for a given formation porosity. This effect is illustrated in FIG. 2. The epithermal neutron counting rate ratio is shown as a dashed line and the thermal neutron counting rate ratio is shown as a solid line. It can be seen from this FIG. 2 that the thermal neutron counting rate ratio increases when the formation fluid changes from oil to salt water, but the epithermal neutron counting rate ratio remains unchanged. The magnitude of the differential between the two ratios can be further seen to increase as the formation porosity increases, FIG. 2 illustrating examples for 10%, 20%, and 30% porosities of a limestone formation.

Coupled to the outputs of ratio detectors 41 and 42 is the recorder 44. Such a recorder may preferably be a continuous trace recorder having its chart driven continuously in correlation with depth by way of mechanical connection 45 and measuring reel 46 coupled to cable 47. Cable 47 is wound and unwound upon drum 48 driven by motor 49 and mechanical connection 50 to move the borehole tool through the borehole. The ratio signal from ratio detector 41 is recorded as trace 51 and the ratio signal from ratio detector 42 is recorded as trace 52 as the logging tool is continuously moved through the borehole.

By recording the outputs of the ratio detectors 41 and 42 as continuous traces 51 and 52, respectively, one can readily observe changes in the differential between the magnitudes of the signals from such detectors and thereby distinguish oil bearing zones from salt water bearing zones with the formation surrounding the borehole since the magnitude of such differential is much larger for a salt water bearing zone than for an oil bearing zone.

In a further aspect of the invention the signals from both ratio detectors 41 and 42 are applied to comparator 53 which is calibrated to provide an output signal representative of oil saturation, that is, the volume fraction of the fluid in the subsurface formation that is occupied by oil. Theoretically, oil saturation can be represented by the following expressions:

$$\Sigma_{formation} = \Sigma_{rock} (1-\phi) + \Sigma_{fluid} \phi \quad (2)$$

$$\Sigma_{fluid} = \Sigma_{oil} S_{oil} + \Sigma_{water} S_{water} \quad (3)$$

$$S_{oil} = 1 - S_{water} \quad (4)$$

where,
$\Sigma$ represents macroscopic absorption cross section,
S represents saturation (or volume fraction of particular fluid in place), and
$\phi$ represents porosity.

By rewriting Equation (2) in the terms of Equations (3) and (4), the oil saturation $S_{oil}$ can be represented as follows:

$$S_{oil} = \frac{\Sigma_{rock}(1-\phi) + \Sigma_{water}\phi - \Sigma_{formation}}{\phi(\Sigma_{water} - \Sigma_{oil})} \quad (5)$$

Of the five variables on the right-hand side of Equation (5) required for the determination of oil saturation $S_{oil}$, the macroscopic absorption cross sections of rock ($\Sigma_{rock}$), oil ($\Sigma_{oil}$), and water ($\Sigma_{water}$) are known from laboratory experiments. The remaining two variables, porosity ($\phi$) and macroscopic absorption cross section of the formation ($\Sigma_{formation}$), are represented by the signals from ratio detectors 41 and 42. It will be apparent to those skilled in the art that comparator 53 may be calibrated in terms of the experimentally determined values for the macroscopic absorption cross sections of rock, oil, and water so as to yield an output signal $S_{oil}$ that is indicative of the oil saturation in the subsurface formation being logged.

Preferably, the comparator 53 includes at least one operational amplifier to which are applied the signal from ratio detector 41 and the signal from ratio detector 42. Feedback and biasing resistors are selected for calibrating the output signal from the operational amplifier for the experimentally determined values of the macroscopic absorption cross sections of rock, oil, and water. In this type configuration, the comparator 53 determines the relative values of the signals from the ratio detectors 41 and 42 and provides the output signal $S_{oil}$ representative of oil saturation.

In the foregoing-described preferred embodiment, the detectors 12 and 13 are thermal neutron detectors utilized for detecting that secondary radiation that represents predominantly the thermal neutron parameters of the formation being logged. In an alternate embodiment, this same nature of secondary radiation may be detected by the use of gamma-ray detectors that measure the thermal neutron capture gamma rays emitted by the formation. It is therefore to be understood that within the scope of the appended claims the measurement of that secondary radiation representing predominantly the thermal neutron parameters of the formation may be carried out by either the detection of thermal neutrons or thermal neutron capture gamma rays.

I claim;

1. A method of logging the formations traversed by a borehole, comprising the steps of:
    a. locating a steady-state source of primary radiation within the borehole to irradiate the formations with fast neutrons, b. at first and second spaced-apart positions within said borehole measuring secondary radiation that represents predominantly the epithermal neutron parameters of the formation being logged, c. at third and fourth spaced-apart positions within said borehole measuring secondary radiation that represents both the epithermal and the thermal neutron parameters of the formation being logged, d. producing a first ratio of the secondary radiation measured at said first and second spaced-apart positions, said first ratio being indicative predominantly of the porosity of the formation being logged, e. producing a second ratio of the secondary radiation measured at said third and fourth spaced-apart positions, said second ratio being indicative predominantly of both the porosity and the macroscopic absorption cross section of the formation being logged, and f. determining the differential between said first and second ratios as an indication of the salinity of the formation being logged, said first ratio being unaffected by such salinity and said second ratio increasing and decreasing as such salinity increases and decreases respectively.

2. The method of claim 1 wherein the step of determining said differential comprises the recording of both said first and second ratios in correlation with the depth of logging in said borehole, an increase in the differential between the recorded ratios at a given depth indicating a change from an oil bearing zone to a salt water bearing zone in the formation and a decrease in the differential between the recorded ratios at a given depth indicating a change from a salt water bearing zone to an oil bearing zone in the formation.

3. The method of claim 1 wherein the step of determining said differential comprises the steps of:

a. producing a signal representative of the differential between said first and second ratios, and b. correcting said differential signal by known factors for the macroscopic absorption cross sections of rock, oil, and water in the formation, thereby producing an indication of oil saturation in an oil bearing zone of the formation being logged.

4. A system for logging the formations traversed by a borehole, comprising:

a. a borehole tool, b. means for moving said borehole tool through a borehole, c. a steady-state source of fast neutrons located within said borehole tool for irradiating the formations surrounding the borehole with neutrons, d. a pair of thermal neutron detectors located within said borehole tool at spaced-apart positions from said source, e. a pair of epithermal neutron detectors located within said borehole tool at spaced-apart positions from said source, f. means for producing a ratio of the number of thermal neutrons measured by said thermal neutron detectors, g. means for producing a ratio of the number of epithermal neutrons measured by said epithermal neutron detectors, and h. means for determining the differential between said ratios to distinguish between oil bearing zones and salt water bearing zones of the formation being logged.

5. The system of claim 4 wherein said means for determining said differential between said ratios includes a recorder for producing continuous traces of said ratios in side-by-side relationship in correlation with depth.

6. The system of claim 4 wherein said means for determining said differential between said ratios includes:

a. a comparator for producing a signal representative of the differential between said ratios, and b. means for correcting said differential signal for effects of the macroscopic absorption cross sections of the rock, oil, and water of the formation, said corrected signal being indicative of the oil saturation of the formation.

* * * * *